United States Patent [19]

Gudmestad et al.

[11] Patent Number: 4,584,912
[45] Date of Patent: Apr. 29, 1986

[54] WIRE FEEDING, CUTTING AND STRIPPING APPARATUS HAVING CLUTCH-OPERATED FEED AND CAM-OPERATED CUTTER/STRIPPER

[75] Inventors: Ragnar Gudmestad, West Allis; Robert O. Dusel, Brookfield; James Berres, Milwaukee, all of Wis.

[73] Assignee: Artos Engineering Company, New Berlin, Wis.

[21] Appl. No.: 731,021

[22] Filed: May 6, 1985

[51] Int. Cl.⁴ .............................................. H02G 1/12
[52] U.S. Cl. .................................... 81/9.51; 29/33 M
[58] Field of Search ....................... 81/9.51, 9.4, 9.41, 81/9.42; 29/566.1, 564.4, 33 M

[56] References Cited

U.S. PATENT DOCUMENTS

| | | | |
|---|---|---|---|
| 2,929,136 | 3/1960 | Andren | 81/9.51 |
| 3,909,900 | 10/1975 | Gudmestad | 29/564.4 |
| 3,913,426 | 10/1975 | Blaha | 81/9.51 |
| 4,275,619 | 6/1981 | Shimizu | 81/9.51 |

*Primary Examiner*—James L. Jones, Jr.
*Attorney, Agent, or Firm*—James E. Nilles

[57] ABSTRACT

A small, simple, accurate, low-cost wire cutting and stripping apparatus includes a wire feed mechanism which periodically feeds a measured length of an insulated wire strand to a wire cutter/stripper mechanism which clamps the wire strand, severs it and scores the insulation, axially separates the wire segment cut from the wire strand and strips the scored insulation during such axial separation. The wire feed mechanism is driven intermittently by a continuously rotating electric motor through an electrically-operated wire feed clutch/brake, the clutch mechanism of which engages in response to an electric signal from a timer switch (start wire feed) and which disengages in response to an electric signal from an electric wire measuring encoder (measure and stop wire feed). The wire cutter/stripper mechanism includes a stationary pair of separable clamps, a movable pair of separable bladed cutter/stripper heads and a movable pair of separable clamps. A barrel cam is periodically rotated for one revolution by the continuously rotating electric motor through a solenoid-operated one-revolution clutch in response to an electric signal from the encoder (wire feed stopped, make one cam revolution). The barrel cam has two cam tracks and drives two linkages. One (clamp/cut) linkage simultaneously closes (and subsequently simultaneously reopens) both pairs of clamps and the pair of cutter/stripper heads. The other (strip/return) linkage extends (and subsequently retracts) the movable pair of clamps and the movable pair of cutter/stripper heads so that the former moves a greater distance than the latter along the wire path.

9 Claims, 13 Drawing Figures

WIRE FEEDING, CUTTING AND STRIPPING APPARATUS HAVING CLUTCH-OPERATED FEED AND CAM-OPERATED CUTTER/STRIPPER

BACKGROUND OF THE INVENTION

1. Field of Use

This invention relates generally to apparatus for cutting and stripping insulated wire. In particular, it relates to clutch-operated wire feed means and cam-operated cutter/stripper means for such apparatus.

2. Description of the Prior Art

The prior art discloses many types of apparatus for feeding a strand of insulated wire along a path, for repeatedly cutting wire segments of predetermined length from the wire strand, and for stripping insulation from the cut segments. Generally speaking, the size, complexity and cost of such apparatus increases in proportion to the production rate and speed at which it is designed to operate and the number of variables which it is designed to take into account, i.e. wire size, wire segment length, location and amount of insulation to be stripped, ease of set-up for different production runs, coordination with other wire processing machines and so forth. Thus, apparatus capable of high-speed operation and having many control functions is complex and costly to manufacture and is usually employed only for wire-processing operations which are carried out continuously and require high speed operation and elaborate control, coordination and versatility. However, many industries and shops require less complex, less costly wire cutting and stripping apparatus to be used occasionally for small production runs, but which still must be accurate and reliable in operation and economical to purchase, operate and maintain.

SUMMARY OF THE INVENTION

Apparatus in accordance with the invention for feeding, cutting and stripping an insulated wire strand comprises wire feed means operable to feed the strand along a path and wire cutter/stripper means for receiving the wire strand from the wire feed means and operable to cut a wire segment from said strand, to score the insulation on the cut segment and/or the cut end of the strand, and to strip the scored insulation therefrom. The apparatus further comprises drive means for operating the wire feed means and the cutter/stripper means and comprises a motor, a selectively operable wire feed clutch/brake mechanism connected between the motor and the wire feed means, a rotatable cam, a selectively operable one-revolution clutch mechanism connected between the motor and the cam, and linkage means connected between the cam and the wire cutter/stripper means. The apparatus also comprises control means for controlling the operation of the wire feed clutch/brake mechanism and the one-revolution clutch mechanism and such control means comprises timer means to initiate operation of (engage) the wire feed clutch/brake mechanism to start wire feed, wire measuring means including an encoder device responsive to the length of wire strand fed to operate (brake and disengage) the wire feed clutch/brake mechanism to terminate wire feed and to initiate operation of (engage) the one-revolution clutch mechanism and thereby initiate operation of the wire cutter/stripper means.

The wire cutter/stripper means comprises stationary clamp means, movable cutter/stripper head means and movable wire clamp means. Both the stationary and movable wire clamp means and the cutter/stripper head means have open and closed positions. The movable wire clamp means and the cutter/stripper head means are reciprocably movable along the wire path between retracted and extended positions. The cam, which takes the form of a barrel cam, comprises two cam tracks thereon, namely, a clamp/cut track on its flat end surface and a strip/return track on its cylindrical peripheral surface thereon. The linkage means comprises a first (clamp/cut) linkage including a first roller-type cam follower connected to the clamp/cut cam track for effecting opening and closing of both wire clamp means and the cutter/stripper head means. The linkage means further comprises a second (strip/return) linkage including a second roller-type cam follower connected to the strip/return cam track for effecting extension and retraction of the movable wire clamp means and the movable cutter/stripper head means. To effect stripping of the scored insulation, the linkage means is constructed so that the distance between the retracted and extended positions of the movable wire clamp means is greater than the distance between the retracted and extended positions of the movable cutter/stripper head means. Furthermore, although both movable means leave their respective retracted positions at the same time, the movable cutter/stripper head means reaches its fully extended position and stops before the movable wire clamp means reaches its fully extended position and stops.

The feed clutch/brake mechanism is electrically operated by internal coils and the one-revolution clutch mechanism is electrically operated by an external solenoid, and the timer means and the encoder device each provide electrical control signals. The feed clutch/brake mechanism includes or is associated with brake means which operates to prevent wire strand movement in either direction (forward or reverse) just (milliseconds) before and then after the clutch of the feed clutch/brake mechanism is disengaged.

In one periodic cycle of operation, the wire feed means operates for a short interval of time to feed a predetermined length of an insulated wire strand along the path to the wire cutter/stripper means. The cutter/stripper means then grips the wire strand when feeding stops, severs it and scores the insulation on either or both sides of the cut, axially separates the wire segment cut from the wire strand and strips the scored insulation during such axial separation. The wire feed means is driven by the continuously rotating electric motor through the electrically operated wire feed clutch/brake mechanism which engages its clutch (and releases its brake) in response to an electric signal (start wire feed) to its internal coils from the timer means and which disengages its clutch (just after it applies its brake) in response to an electric signal (measure and stop wire feed) from the wire measuring encoder device when a predetermined length of wire strand is moved therepast. The brake means are then applied, just prior to disengagement of the clutch of the wire feed clutch/brake mechanism, and remain applied to prevent further wire strand movement. The cutter/stripper means is driven by the cam which is rotated through one complete revolution by the continuously rotating electric motor (through a reduction gear box and a decoupler mechanism) when the one-revolution clutch mechanism engages in response to an electric signal (wire feed stopped, start cam rotation) to its solenoid from the wire measuring encoder device. As the cam rotates, the first (clamp/cut) linkage initially effects simultaneous closure of both wire clamp means and the cutter/stripper head means to effect wire cutting and insulation scoring. The second (strip/return) linkage then effects movement of the movable wire clamp means and the movable cutter/stripper head means from their retracted to their extended positions to effect separation of the cut wire segment and stripping of the scored insulation. When the movable wire clamp means and the movable cutter/stripper head means reach their extended positions, both clamp means (stationary and movable) and the cutter head means are opened by operation of the first (clamp/cut) linkage and the second (strip/return) linkage effects return of the movable wire clamp means and the movable cutter/stripper head means to their respective retracted positions, thus completing the cycle. When the clamp means and cutter head means open, the finished wire segment is released into a discharge chute and is collected outside the apparatus. Scrap insulation is disposed of through a chute outside of the apparatus.

Apparatus in accordance with the invention offers several advantages over the prior art. For example, it is very compact and relatively small; one preferred embodiment being adapted to stand on a work-bench and being about one foot high, two feet long and one and one-half feet wide. A single electric motor furnishes driving power for movable components in the wire feed means, and indirectly to the wire measuring means and the wire cutter/stripper means. The motions of movable components in the linkage means and the wire cutter/stripper means are precisely coordinated and accurately timed mechanically by the barrel cam and, therefore, cannot get out of synchronism. The control means employ a minimum of electrically-controlled components and sensing devices thereby contributing to increased reliability and accuracy and reduced cost and maintenance. Different types of cutter/stripper head means, wire feed wheels and clamp pads can be interchangeably employed and adjusted to accommodate different wire sizes and to effect various types of insulation scoring and stripping operations. The length of wire segments to be cut from a wire strand can be easily adjusted. The apparatus is accurate and reliable in operation, simple to operate, easily adjusted for different production runs, safe to use, occupies very little space and is economical to purchase, operate and service. Other objects and advantages will hereafter appear.

DRAWINGS

Figure 1:
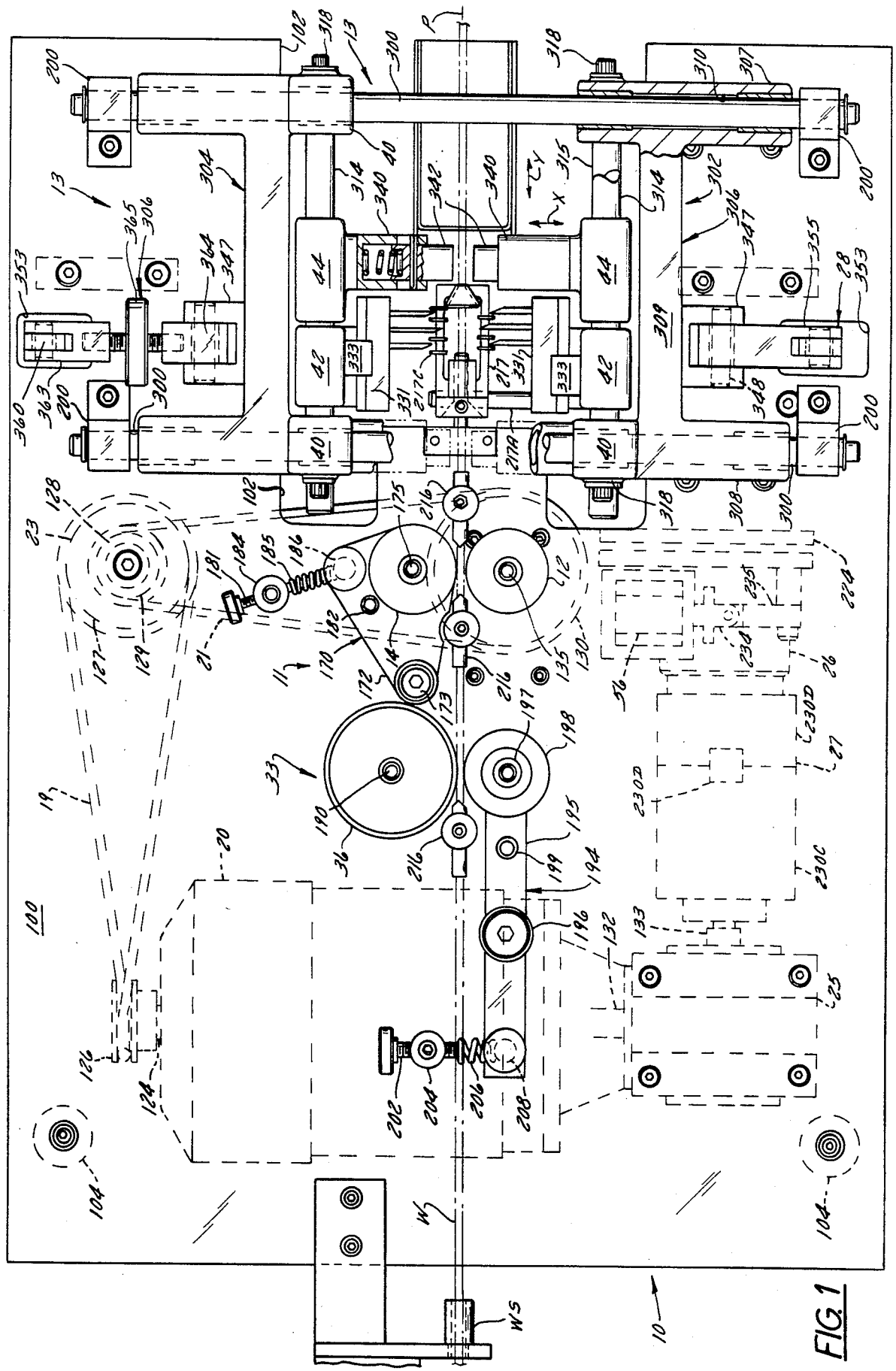
FIG. 1 is a top plan view of apparatus in accordance with the present invention and, among other things, shows components, such as the pairs of clamps and cutter/stripper heads of the wire cutter/stripper mechanism, in retracted/open condition.
Figure 13:
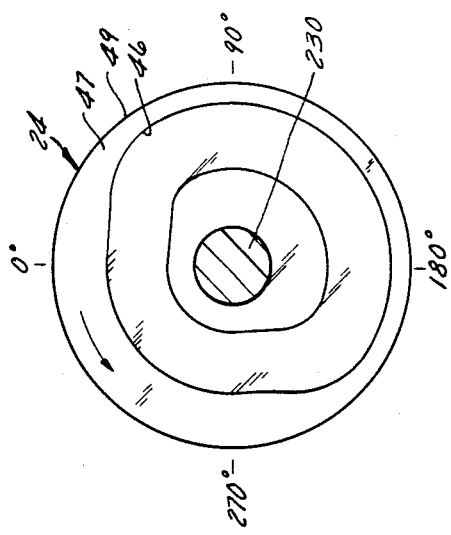
Figure 12:
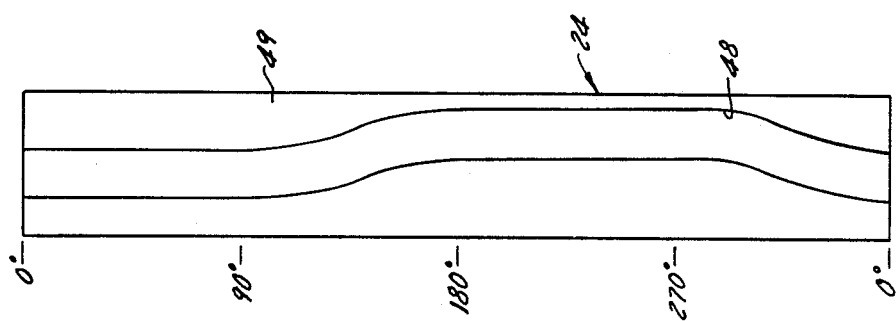
Figure 8:
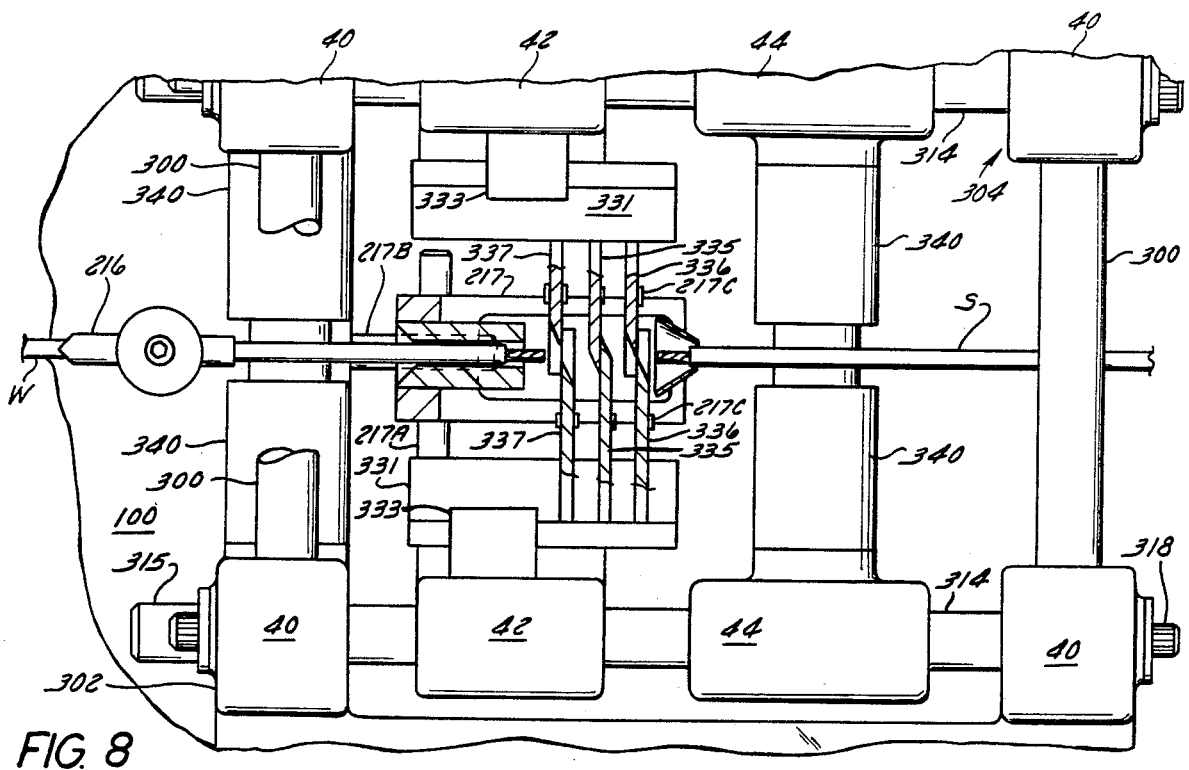
FIG. 8 is an enlarged view similar to FIG. 7 and shows the said component in partially extended/fully closed condition.
Figure 9:
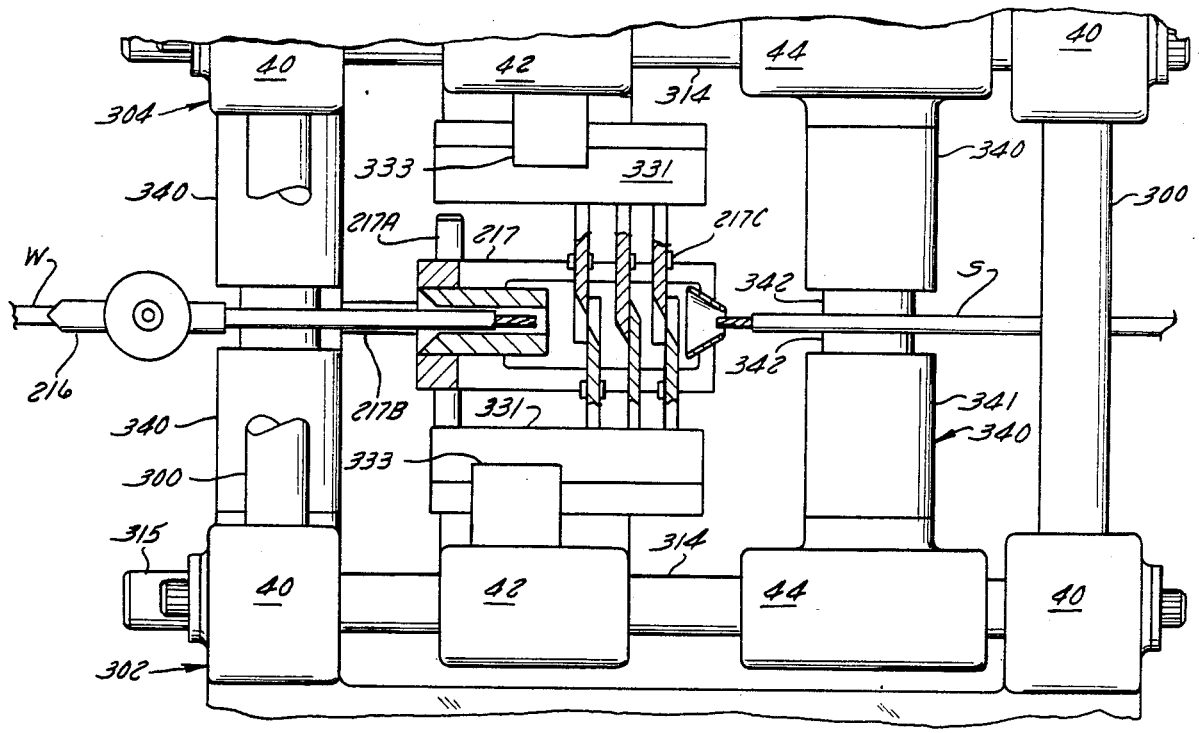
Figure 10:
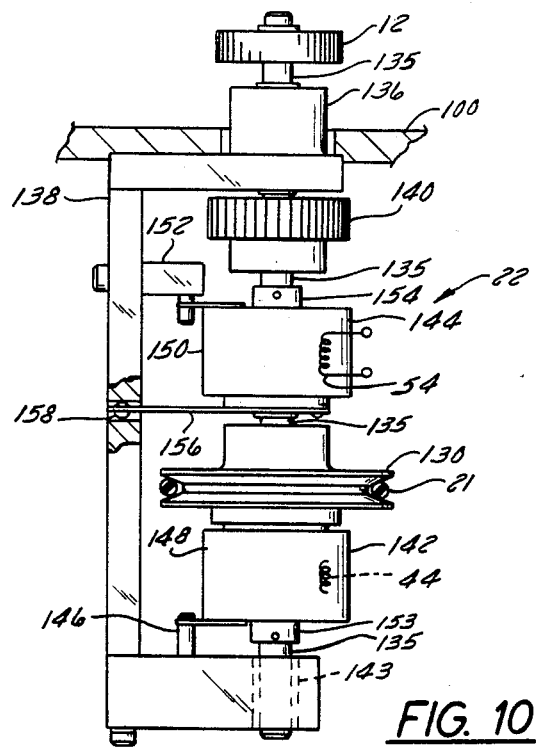
Figure 11:
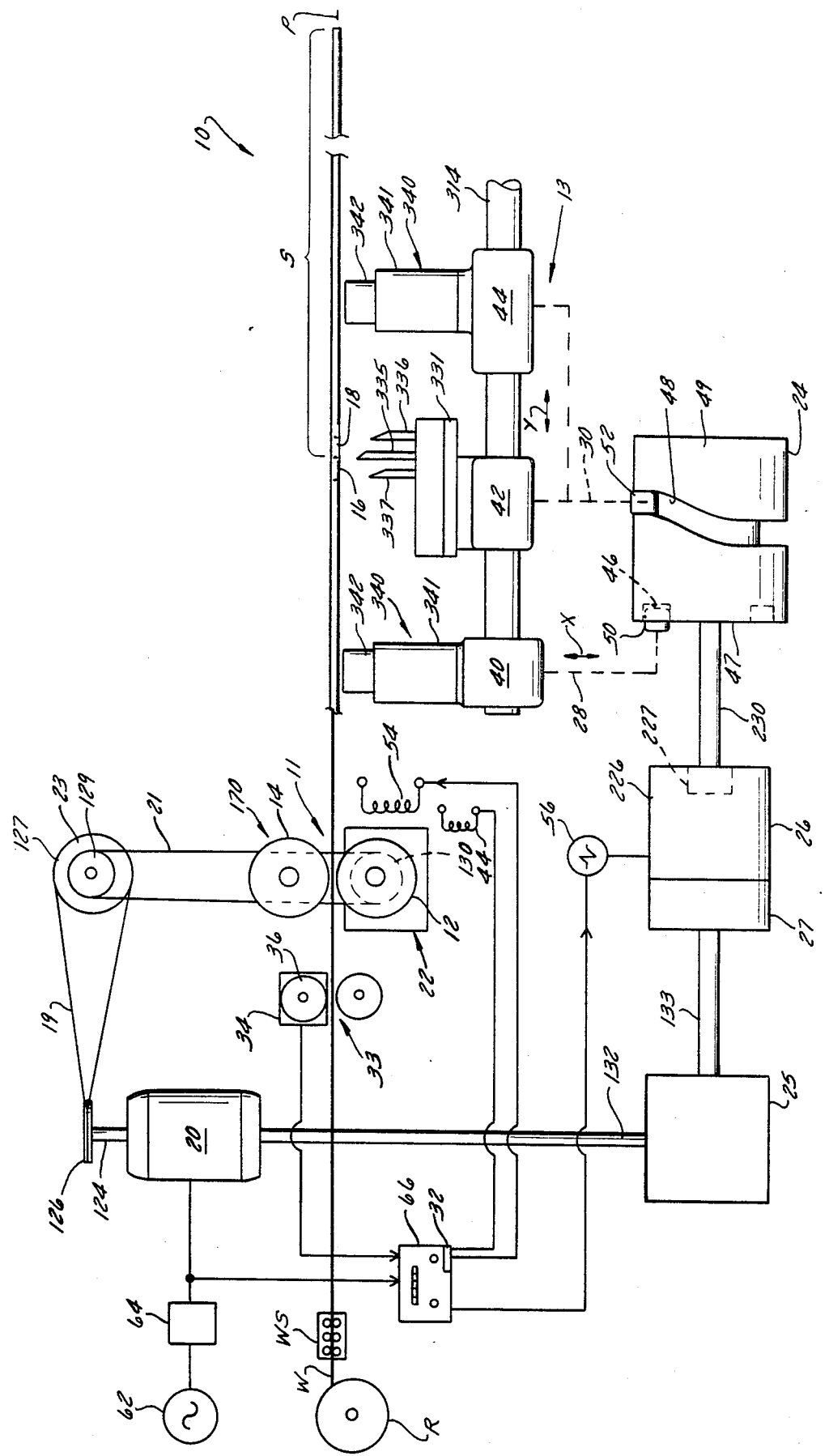

FIG. 9 a view similar to FIG. 8 and shows the said components in fully extended/closed condition;

FIG. 10 is an enlarged side elevation view of an electrically controlled feed clutch/brake mechanism for a wire feed wheel shown in FIG. 1;

FIG. 11 is a schematic diagram of the apparatus of FIG. 1 and the control means therefor; and FIGS. 12 and 13 are views showing the developed cam tracks of a barrel cam shown in FIG. 11.

DESCRIPTION OF A PREFERRED EMBODIMENT

Referring to FIGS. 1 and 11, apparatus 10 in accordance with the invention for feeding, cutting and stripping an insulated wire strand W, which is supplied from a reel R through a wire-straightener WS, comprises wire feed means 11, including wire feed wheels 12 and 14, operable to feed the strand along a path P and wire cutter/stripper means 13 for receiving the wire strand W from the wire feed means 11 and operable to cut a wire segment S from wire strand W, to score the insulation on the cut segment S and/or the cut end of the strand W, and to strip the scored insulation pieces 16 and 18 (FIG. 7) therefrom. Apparatus 10 further comprises drive means for operating the wire feed means 11 and the cutter/stripper means 13 and comprises a motor 20, a selectively operable wire feed clutch/brake mechanism 22 connected between motor 20 and wire feed wheel 12, a rotatable barrel cam 24, a selectively operable one-revolution clutch mechanism 26 connected between motor 20 and barrel cam 24, and linkage means, including linkages 28 and 30 (FIG. 6), connected between cam 24 and wire cutter/stripper means 13. Apparatus 10 also comprises control means (FIG. 11) for controlling the operation of wire feed clutch/brake mechanism 22 and one-revolution clutch mechanism 26 and such control means comprises timer means, including a timer switch 32 (FIG. 11), to initiate operation of (engage) wire feed clutch mechanism 22 to start wire feed, wire measuring means 33, including an encoder device 34 (FIGS. 2 and 11) and a measuring wheel 36 responsive to the length of wire strand which was fed, to operate (brake and disengage) wire feed clutch mechanism 22 to terminate wire feed and to initiate operation of (engage) one-revolution clutch mechanism 26 and thereby initiate operation of wire cutter/stripper means 13.

The wire cutter/stripper means 13 comprises stationary clamp means 40, axially movable (along path P) cutter/stripper head means 42 and axially movable (along path P) wire clamp means 44. Both the stationary and movable wire clamp means 40 and 44, respectively, and the cutter/stripper head means 42 have open and closed positions. The movable wire clamp means 40 and the cutter/stripper head means 42 are reciprocably movable along wire path P between retracted and extended positions (compare FIGS. 1, 7, 8 and 9). The cam 24, which takes the form of a barrel cam, comprises two cam tracks thereon, namely, an eccentric clamp/cut track 46 on its flat end surface 47 (see FIG. 13) and a sinuous strip/return track 48 on its cylindrical peripheral surface 49 (see FIG. 12). The linkage means comprises first (clamp/cut) linkage 28 including a first roller-type cam follower 50 connected to the clamp/cut cam track 46 for effecting opening and closing movement of both wire clamp means 40 and 44 and the cutter/stripper head means 42 (see arrow X in FIGS. 1, 6 and 11). The linkage means further comprises second (strip/return) linkage 30 including a second roller-type cam follower 52 connected to the strip/return cam track 48 for effecting extension and retraction movement of the movable wire clamp means 44 and the movable cutter/stripper head means 42 (see arrow Y in FIGS. 1, 6 and 11). To effect stripping of the scored insulation pieces 16 and 18, the linkage means and cam 24 are constructed, as FIG. 7 shows, so that the distance A between the retracted and extended positions of movable wire clamp means 44 is greater than the distance B between the retracted and extended positions of movable cutter/stripper head means 42. Furthermore, although both movable means 42 and 44 leave their respective retracted positions A1 and B1 at the same time, movable cutter/stripper head means 42 reaches its fully extended position B2 and stops before movable wire clamp means 44 reaches its fully extended position A2 and stops.

The feed clutch/brake mechanism 22 and the one-revolution clutch mechanism 26 are each electrically operated by internal coils 44 and 54 (FIGS. 10 and 11) and an external solenoid 56 (FIGS. 1 and 11), respectively, and timer switch 32 of the timer means and the encoder device 34 of the measuring means each provides electrical control signals. The feed clutch/brake mechanism 22 includes (or may be otherwise associated with) brake means in the form of an electric brake mechanism 144 (FIG. 10) which operates to prevent wire strand movement in either direction (forward or reverse) when an electric clutch mechanism 142 (FIG. 10) of the feed clutch mechanism 22 is disengaged. The brake means 60 are engaged just prior to disengagement of feed clutch mechanism 22 and remain engaged after disengagement of the feed clutch mechanism 22 until released, as hereinafter explained.

As FIG. 11 shows, a source of electric power 62, controlled by an on/off switch 64, is provided to energize motor 20 and to energize a control panel 66 which receives electric signals from encoder device 34 and provides electric signals (in the form of operating power) to coils 44 and 54 of wire feed clutch/brake mechanism 22 and to solenoid coil 56 for one-revolution clutch mechanism 26. Control panel 66 includes timer means, including timer switch 32, which can be manually adjusted to feed and measure desired lengths of the wire strand W and thus determine the length of a cut segment S. Control panel 66 also includes means to provide a visual indication of the segment length chosen and to provide a count of the number of segments to be cut and subsequently cut.

In one periodic cycle of operation, wire feed means 11 operates for a short interval of time to feed a predetermined length of insulated wire strand W along path P to wire cutter/stripper means 13. The cutter/stripper means 13 then grips wire strand W when feeding stops, severs it and scores the insulation on either or both sides of the cut (depending on the type cutter/stripper means chosen), axially separates wire segment S cut from wire strand W and strips the scored insulation pieces 16 and 18 (which become scrap) during such axial separation. The wire feed means 11 is intermittently driven by continuously rotating electric motor 20 through electrically operated wire feed clutch/brake mechanism 22 (and through drive belt 19 and 21 on an idler pulley 23) in response to an electric signal (start wire feed) to its internal coils 44 and 54 from timer switch 32. Clutch mechanism 142 disengages in response to an electric signal (measure and stop wire feed) from wire measuring encoder device 34 when a predetermined length of wire strand W is moved therepast. The electric brake mechanism 144, which is applied just a few milliseconds prior to disengagement of wire feed clutch mechanism 22, remain applied to prevent further wire strand movement after clutch mechanism 144 disengages. The cutter/stripper means 13 is driven by cam 24 which is rotated through one complete revolution by continuously rotating electric motor 20 (through a reduction gear box 25 and a splined disengagement decoupler mechanism 27) when one-revolution clutch mechanism 26 engages in response to an electric signal (wire feed stopped, start cam rotation) to its solenoid 56 from wire measuring encoder device 34. As cam 24 rotates, the first (clamp/cut) linkage 28 initially effects simultaneous closure of both wire clamp means 40, 44 and cutter/stripper head means 42 to effect wire cutting and insulation scoring. The second (strip/return) linkage 30 then effects movement of movable wire clamp means 44 and the movable cutter/stripper head means 42 from their retracted to their extended positions to effect separation of cut wire segment S and stripping of the scored insulation. When movable wire clamp means 44 and movable cutter/stripper head means 42 reach their extended positions, both clamp means 40, 44 (stationary and movable) and cutter head means 42 are opened by operation of the first (clamp/cut) linkage 28, thereby enabling disposition of the finished wire segment and insulation scraps, and the second (strip/return) linkage 30 effects return of movable wire clamp means 44 and movable cutter/stripper head means 42 to their respective retracted positions, thus completing the cycle.

Figure 2:
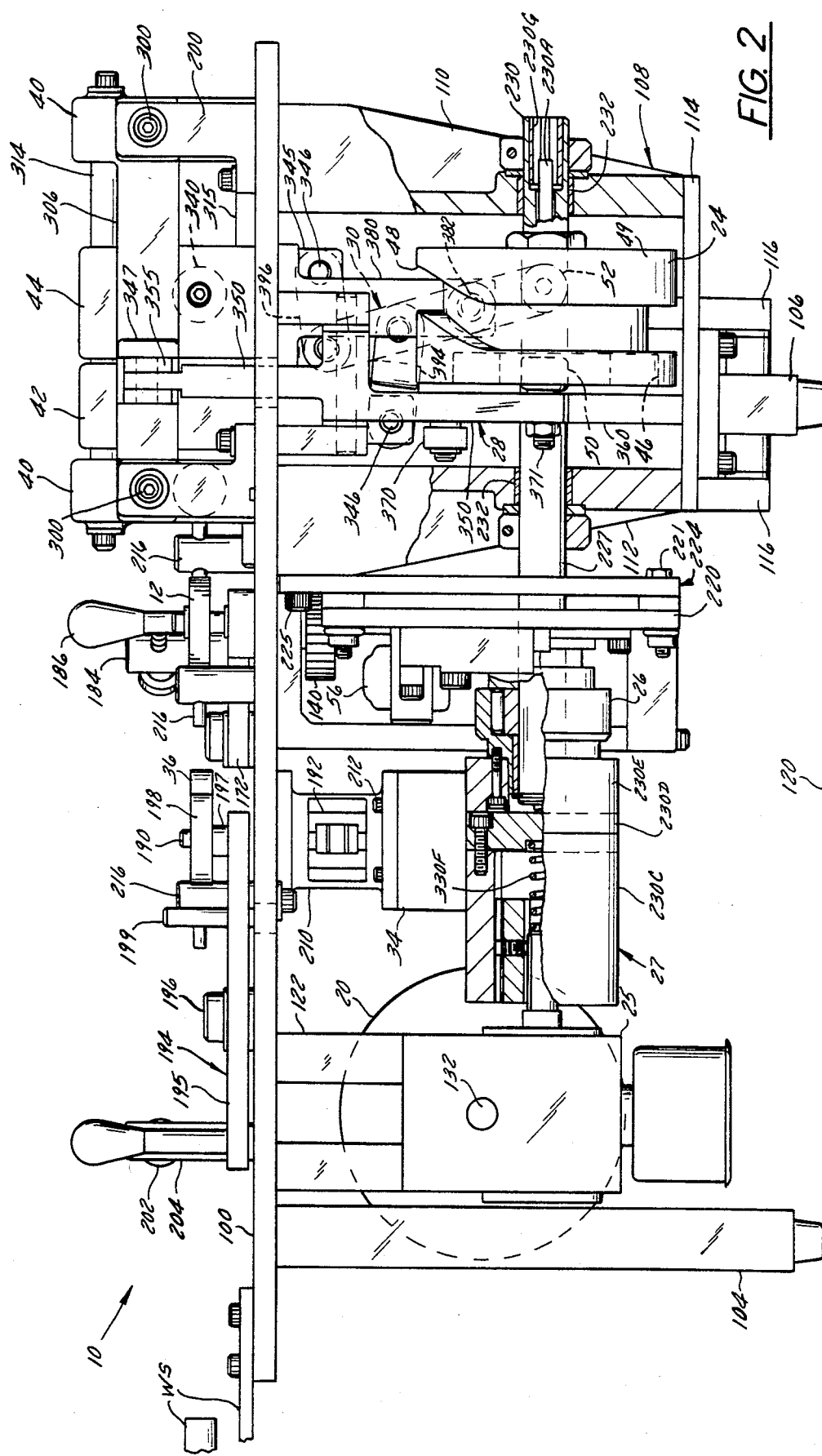
FIG. 2 is a side elevation view of the apparatus of FIG. 1.

As FIGS. 1 through 5 show, apparatus 10 has a rigid metal supporting framework on which the aforementioned means and mechanisms are mounted. The framework comprises a rigid metal plate 100 having a cut-out 102 to accommodate cutter/stripper mechanism 13. Plate 100 is supported at one (infeed) end by a pair of legs 104 and at its other (discharge) end by a pair of short legs 106 attached to the bottom of a rigid cross brace 118 which is attached to the underside of plate 100. Mounting bracket assembly 108 comprises a pair of spaced apart rigid brackets 110 and 112 which are joined at their lower ends by a plate 114. Two brackets 116 are attached to and extend downwardly from plate 100 and the rigid cross brace 118 is connected between plate 114 and the brackets 116. Preferably, for reasons of safety and cleanliness, apparatus 10 which is shown in FIG. 2 as standing on a surface 120 of a work bench or table, may be provided with a clear plastic cover or shroud (not shown) which overlies the upper side of plate 100 and depends downwardly from all sides of plate 100.

Referring to FIGS. 1 through 5 and 11, motor 20 which is adapted to rotate continuously in one direction when in operation, is rigidly mounted by a motor support brackets 122 on the underside of plate 100. Motor 20 has a rotatable drive shaft 124 at one end to which a pulley 126 is secured for rotation therewith. Pulley 126 drives endless flexible belt 19 which is disposed therearound and around an upper groove 127 of idler pulley 23 which is rotatably mounted on the lower end of a downwardly extending elongated pulley support 128 which is rigidly secured to the underside of plate 100. Idler pulley 23 has a lower groove 129 and endless flexible belt 21 is disposed therearound and around a drive pulley 130 in feed clutch/brake mechanism 22.

Motor 20 has another rotatable drive shaft 132 at its opposite end which is connected to the drive power input side of reduction gear box 25 which is rigidly secured to the underside of plate 100. Reduction gear box 25 has an output shaft 133 and is connected through spline mechanism 27 to one-revolution clutch 26.

Referring to FIG. 10, feed clutch/brake mechanism 22, when energized and engaged, effects rotation in one direction only of wire feed wheel 12. Feed wheel 12 is mounted above plate 100 near the upper end of a feed drive shaft 135 which is rotatably supported in a bearing housing 136 rigidly secured to a clutch/brake support bracket 138. A gear 140 is mounted near the lower end of feed drive shaft 135. The C-shaped clutch/brake support bracket 138 is rigidly mounted on the underside of plate 100 and supports a one-way mechanical clutch mechanism 143, the electric clutch mechanism 142 which includes electric coil 44, and the electrical brake means or mechanism 144 which includes the electric coil 54. The drive pulley 130, previously mentioned, is mounted on the input end of electric clutch 142 and effects rotation of a shaft 135 which extends down into one-way mechanical clutch mechanism 143 when electric clutch 142 is energized and engaged. Thus, shaft 135 is rotatable only in one direction (clockwise, if FIG. 10 is viewed from the top) when drive pulley 130 is rotated by belt 21. Clutch mechanism 142 has a stationary housing 148 which is secured against rotation by an anti-rotation pin 146 which is rigidly attached to support bracket 138. Clutch mechanism 142 has rotatable output shaft 153 which is connected to drive feed drive shaft 135 when the clutch is engaged. Clutch mechanism 142 contains within its housing 148 the electric coil 44 which, when energized, causes clutch engagement so that rotation of drive pulley 130 effects rotation of shaft 135 (and wheel 12) as long as the coil 44 is energized. Brake mechanism 144 also contains within its housing 150 the electric coil 54 which is energized (brake applied) shortly before the clutch mechanism 142 is de-energized and clutch disengagement occurs to immediately stop rotation of shaft 135 and feed wheel 12 prevent overrun of the wire being fed. The electric brake mechanism 144 comprises an external brake tab 156 which engages a shock pad 158 on bracket 138 to absorb energy and shock when the brake is applied.

Referring to FIGS. 1, 2, 5 and 11, wire feed mechanism 11 also includes a feed drive idler assembly 170, including idler feed wheel 14, for biasing wire strand W tightly against wire feed wheel 12, so that, as both wheels 14 and 12 rotate they frictionally engage and move strand W along path P. Feed drive idler assembly 170 comprises a lever 172 pivotally mounted on the upper side of plate 100 by a shoulder screw 173. Lever 172 supports a bearing housing 174 which, in turn, rotatably supports an idler shaft 175 which extends through a hole 176 in plate 100 so that its ends project above and below the plate. Idler wheel 14 and a gear 180 are affixed to the upper and lower ends, respectively, of idler shaft 175. Gear 180 meshes with gear 140 on feed drive shaft 135 (see FIG. 10). Lever 172 also supports a lever lock knob 182 which engages a hole (not shown) in the upper surface of plate 100 and hold the lever in open position to enable the operator to thread a wire strand W into the apparatus prior to operation. A rotatable adjusting screw 181 is threadedly mounted on a rigid pin support 184 attached to the upper surface of plate 100 to change the compression of a biasing spring 185 which bears against a tension rod 186 mounted on lever 172.

As FIGS. 1, 2, 3 and 11 show, the wire measuring means 33, including encoder device 34 and encoder wheel 36, provides electric signals indicative of the length of wire fed to coil 44 to effect disengagement of clutch mechanism 142 of wire feed clutch/brake mechanism 22 (and to coil 54 to operate its brake mechanism 144) and to solenoid 56 to effect engagement of one-revolution clutch 26. Encoder device 34 comprises a drive shaft 190 on which encoder wheel 36 is mounted and which is rotatably supported in a bearing housing 192 rigidly secured to plate 100. Encoder wheel 36 is mounted near the upper end of shaft 190 above plate 100 to effect rotation thereof as strand W moves therepast. Bearing housing 192 comprises a rigid support bracket 210 which is rigidly mounted on and located below the underside of plate 100. The encoder device 34 is rigidly mounted on support bracket 210 by screws 212 and takes the form of a commercially available device, such as Model No. 716 available from Encoder Products Company. Thus, as encoder wheel 36 and encoder shaft 190 rotate as the wire strand W moves therepast, encoder device 34 generates electric signals or pulses whose number is indicative of the length of wire which has moved therepast. These signals are fed to an electric counter circuit (not shown) in control panel 66 which, in turn, provides electric control signals to energize the brake coil 54 (and de-energize clutch coil 44) to stop the wire feed when a predetermined length of the wire strand W has been fed. The electric control signal from the counter circuit in control panel 66 is also fed to solenoid 56 to cause engagement of the one-revolution clutch 26 so as to start wire cutting and stripping operations. As previously explained, the brake coil 54 is de-energized and clutch coil 44 is energized to start the wire feed in response to an electric start signal from timer switch 32.

Figure 4:
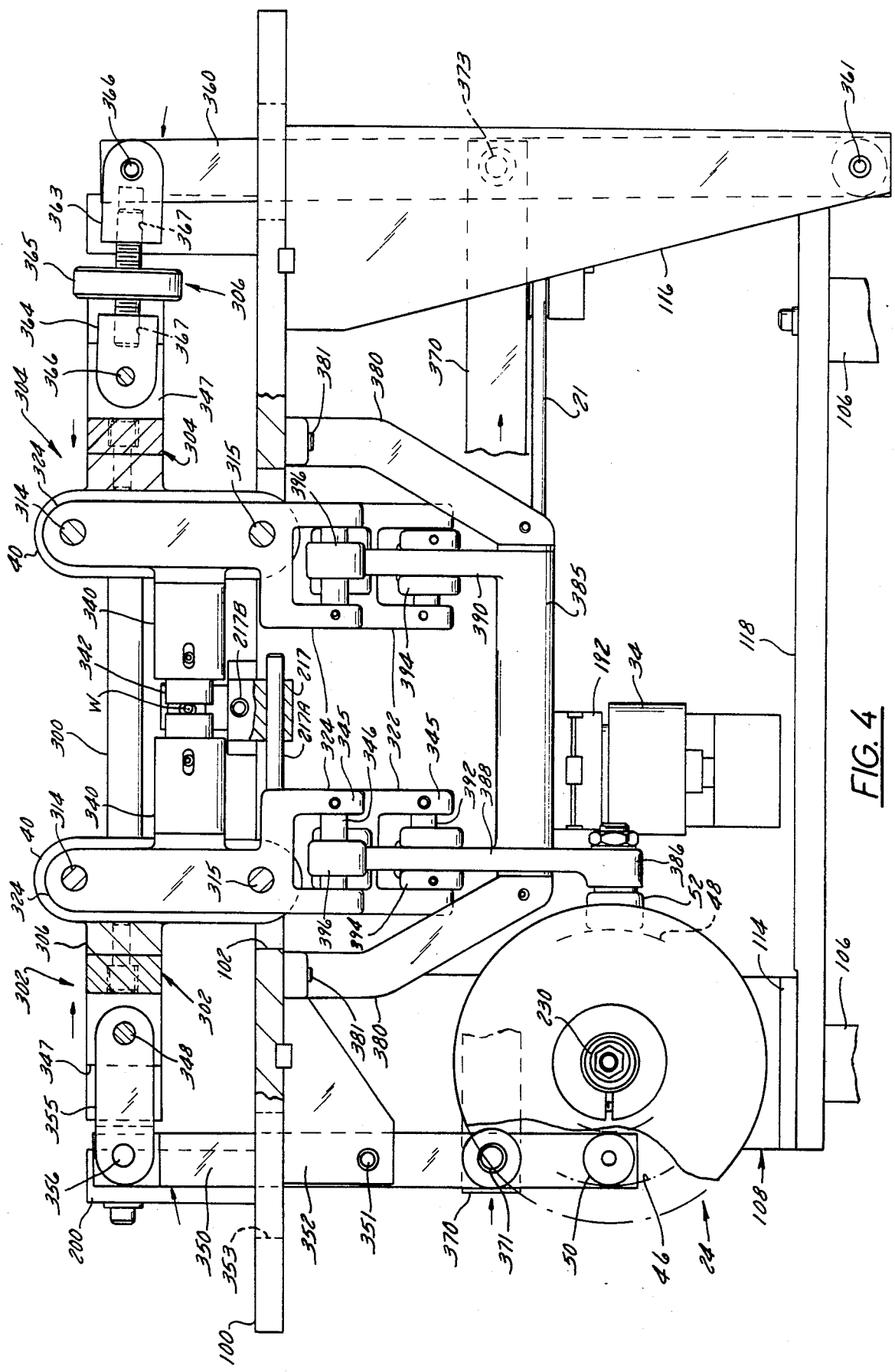
FIG. 4 is a view similar to FIG. 3, with certain elements deleted, and shows the said components in retracted/closed condition.
Figure 5:
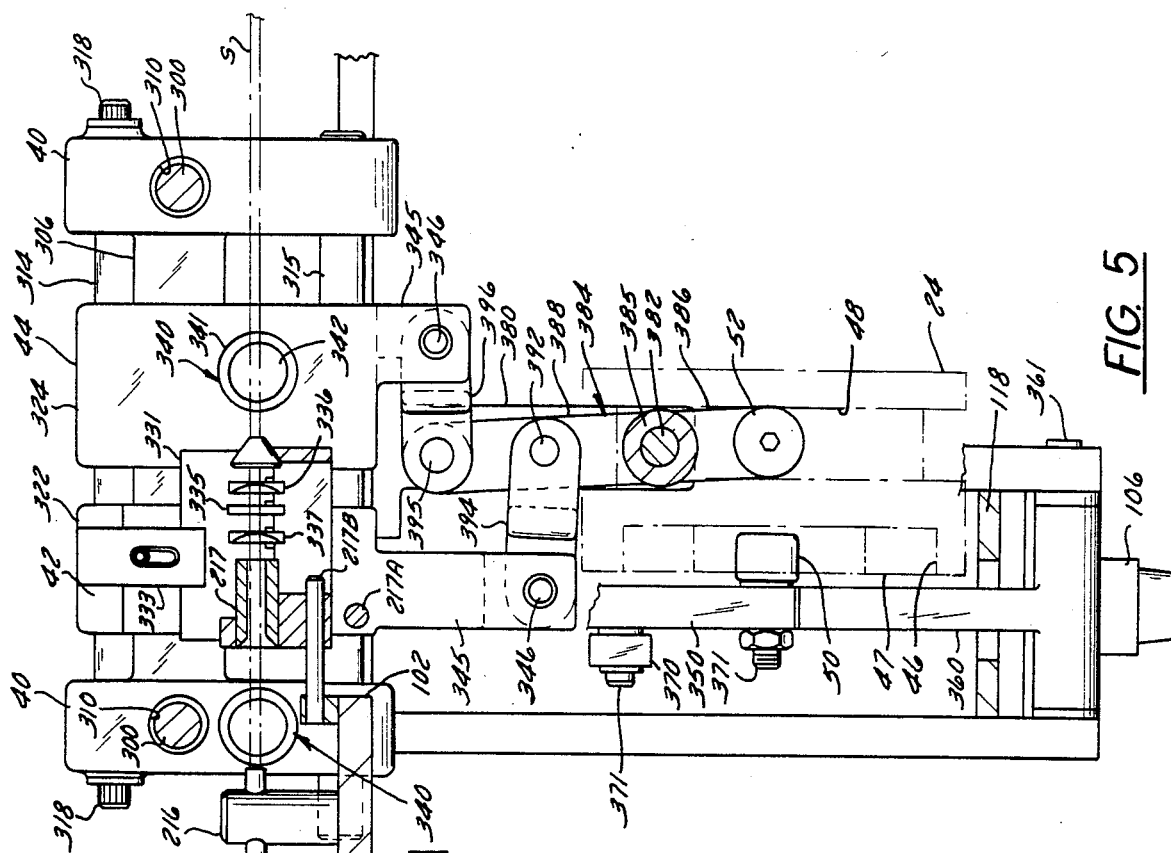
FIG. 5 is a side elevation view, partly in section, of a portion of the wire cutter/stripper mechanism and shows the linkages therefor and also shows the said components in partially extended/fully closed condition.

The wire measuring means 33 also includes a tension lever assembly 194 for biasing the wire strand W tightly against the periphery of encoder wheel 36 so that encoder wheel 36 and its shaft 190 rotates as wire strand W moves along path P. Tension lever assembly 194 comprises a lever 195 pivotally mounted on the upper side of plate 100 by a shoulder screw 196. Lever 195 supports a fixed shaft 197 which has a bearing thereon (not shown) which rotatably supports a tension wheel 198. Lever 195 also supports a lever lock knob 199 which engages a hole (not shown) in the upper surface of plate 100 and thereby lock the lever in an open position to enable the operator to thread a wire strand W into the machine prior to operation. A rotatable adjusting screw 202 is threadedly mounted on a rigid pin support 204 attached to the upper surface of plate 100 to change the compression of a biasing spring 206 which bears against a tension rod 208 mounted on lever 195. As FIG. 1 shows, three wire guides 216 are provided to direct the wire strand W along path P. As FIGS. 1, 4 and 7 show, a wire guide/knock-out assembly 217 is mounted on a tool holder support member 322, hereinafter described. Assembly 217 guides the wire strand W along path P and also comprises knock-out blades 217C (FIG. 1) which remove scrap insulation from the stripping blades 336 and 337 in this specific embodiment. Guide assembly 217 is stationary relative to path P, being slidably mounted on a rod 217A attached to movable member 322 and to a stationary rod 217B attached to the framework of apparatus 10.

Referring now to FIGS. 1, 2 and 11, one-revolution clutch 26, which takes the form of a commercially available device, such as Model IDA6 available from the Hilliard Corporation, and solenoid 56 which effects its operation are both supported below plate 100. One-revolution clutch 26 comprises a stationary housing 220 which is secured with rubber shock-mounting bushings (not shown) by screws 221 to a clutch mounting bracket 224 which, in turn, is rigidly secured to mounting bracket 112 (previously described) by screws 225. Clutch 26 comprises a constantly rotatable input section 226 which is secured to and rotatable with power output shaft 133 of reduction gear box 25 through decoupler mechanism 27. The decoupler mechanism 27 enables the operator to manually rotate the barrel cam 24 and actuate the wire cutter/stripper means 13 for purposes of initial machine set-up and adjustment. As FIG. 2 shows, mechanism 27 comprises relatively rotatable parts 230C and 230E and a key 230D which becomes disengaged from a slot in part 230E when a plunger 230A in shaft 230 is pushed inwardly by means of a detachable hand-crank (not shown) which is insertable in the hole 230G in the end of shaft 230. Clutch 26 further comprises a rotatable output section 227 (which only rotates when the clutch is engaged) which is secured to and drives a drive shaft 230 of barrel cam 24. Barrel cam drive shaft 230 is supported at opposite ends by means of bearings 232 in brackets 110 and 112 (see FIG. 2). Solenoid 56 which operates clutch 26 has a stationary portion which is rigidly mounted on stationary housing 220. As FIG. 1 shows, solenoid 56 further comprises a reciprocably movable plunger 234 which is pivotally connected to and operates a movable actuating lever 235 on clutch 26. In operation, when solenoid 56 is momentarily energized, it effects tripping of actuating lever 235 and engagement of clutch 26. Clutch output section 227 (and barrel cam shaft 230 driven thereby) rotates for one revolution, whereupon clutch 26 then automatically disengages and remains so until solenoid 56 is again momentarily energized.

As FIGS. 1, 2, 3, 4, 5, 6, 10, 11, 12 and 13 show, barrel cam 24 takes the form of a cylinder which is rotatably driven by shaft 230. The roller-type cam followers 50 and 52 are connected to the linkages 28 and 30, respectively, hereinbefore referred to, and operate those linkages through one complete cycle of operation as barrel cam 24 makes one complete revolution. As FIGS. 12 and 13 make clear, as barrel cam 24 rotates, the cam followers 50 and 52 assume certain positions relative thereto and exhibit substantially reciprocating motion in the direction of the arrows X and Y, respectively, in FIG. 6. Consequently, the movable components in linkages 28 and 30 and in cutter/stripper mechanism 13 assume predictable positions directly related to the rotational position of barrel cam 24.

FIGS. 1 through 8 and 10 show the cutter/stripper mechanism 13 and the linkages 28 and 30 which effect operation thereof in response to rotation of barrel cam 24. Mechanism 13 comprises four rod support blocks 200 which are rigidly secured in spaced apart rectangular arrangement on the upper surface of plate 100 on opposite sides of the recess 102. The blocks 200 rigidly support a pair of spaced apart slide rods 300 which are disposed perpendicular to and above path P.

The slide rods 300 slidably support two clamp/cut assemblies 302 and 304 which are identical to each other but reversely disposed. Only clamp/cut assembly 302 is hereinafter described in detail. It should be noted that only assembly 304 is provided with a stroke adjustment mechanism 306 (see FIGS. 1, 3 and 4), hereinafter described, which is part of linkage 28.

Figure 6:
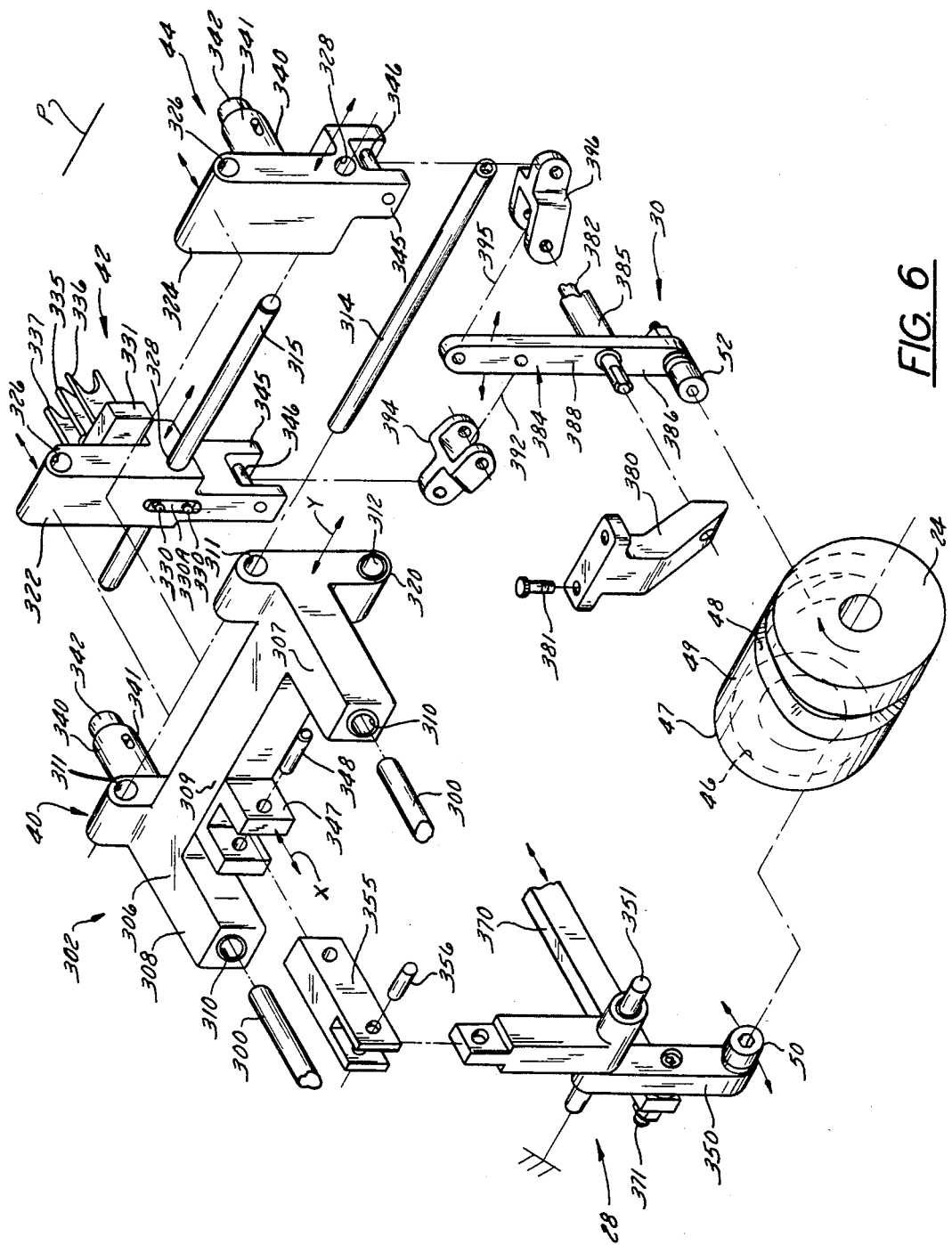
FIG. 6 is an exploded perspective view of the wire cutter/stripper mechanism and the linkages therefor.
Figure 7:
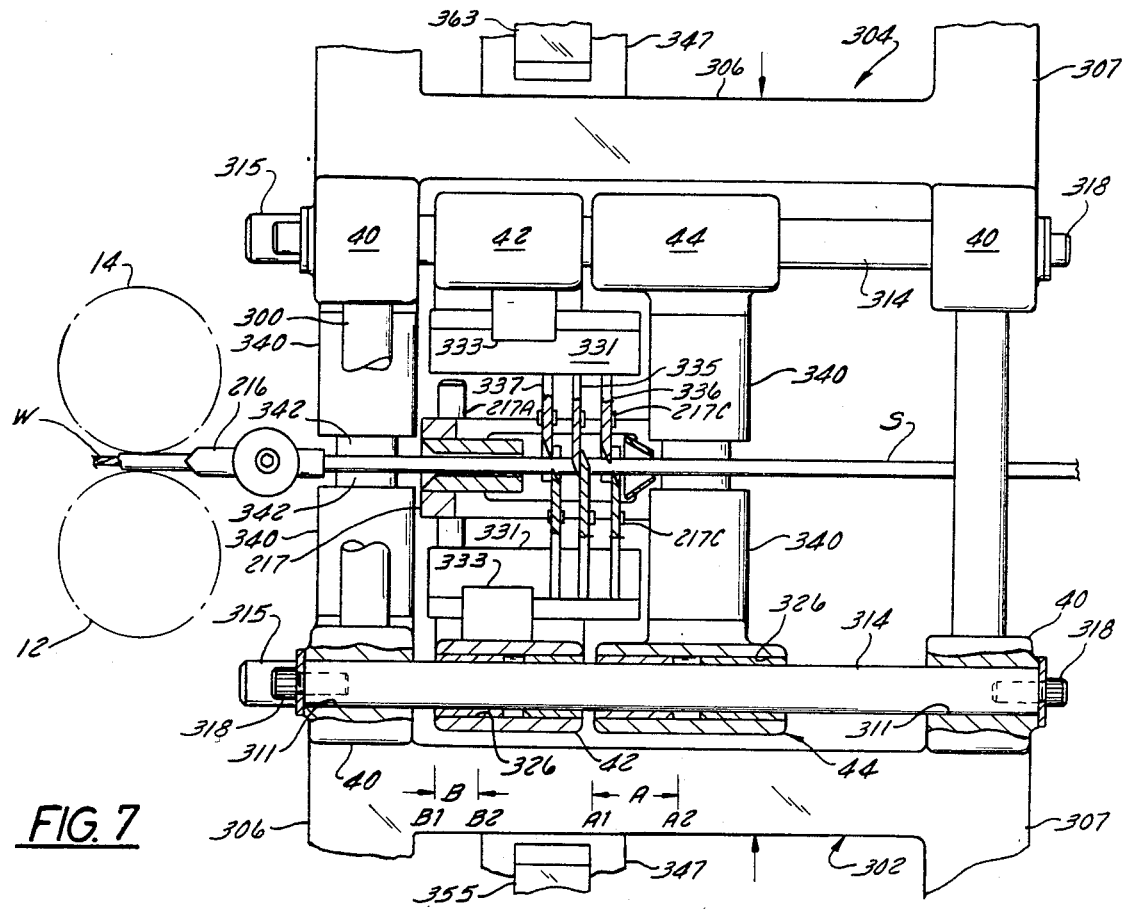
FIG. 7 is an enlarged top plan view of the wire cutter/stripper mechanism and shows the said coponents thereof in retracted/closed condition.

As FIGS. 1 and 6 show, clamp/cut assembly 302 comprises a one-piece cast metal clamp bracket 306 having two spaced-apart end portions 307 and 308 joined by center portion 309. Each end portion 307 and 308 has a bore 310 for receiving a slide rod 300 on which the clamp bracket 306 is slidably mounted for movement toward and away from wire path P (see arrow X). Each end portion 307 and 308 also has an upper bore 311 and a lower bore 312 for receiving and supporting an upper shaft 314 and a lower shaft 315, respectively, which are mounted on clamp bracket 306 and are perpendicular to the slide rods 300. Upper shaft 314 has threaded opposite ends which receive washer nut assemblies 318 which retain it on clamp bracket 306. Lower shaft 315 is slidably mounted on sleeve bearings 320 in the lower bores 312 in clamp bracket 306 and is axially shiftable relative thereto for a short distance, as hereinafter explained, to reduce friction and wear.

The shafts 314 and 315 support a movable tool holder support member 322 and a movable clamp support member 324 which are mounted thereon and are part of the movable cutter/stripper head means 42 and the movable wire clamp means 44, respectively. Each support member 322 and 324 has upper and lower bores 326 and 328, respectively, therein for receiving the upper and lower shafts 314 and 315, respectively. Tool holder support member 322 is rigidly secured to lower shaft 315 by a shaft lock key 330A and two screws 330 to effect movement of lower shaft 315 but is slidable on upper shaft 314. Movable clamp support member 324 is slidable on both upper shaft 314 and lower shaft 315.

Tool holder support member 322 supports a detachable tool holder 331 which is held in place thereon by a sliding clamp pad 333 (FIG. 7). A wire cutter blade 335 and insulation scoring and stripping blades 336 and 337 on opposite sides of cutter blade 335 are stationarily mounted on tool holder 331.

A wire clamp assembly 340 is mounted on each of end portion 308 of clamp bracket 306 and movable clamp support member 324. Each clamp assembly 340 comprises a tubular housing 341 in which a resiliently slidable cylindrical clamp member 342 is mounted.

Each support member 322 and 324 has a clevis 345 and pivot pin 346 at its lower end by means of which it is connected to linkage 30. Clamp bracket 306 has a clevis 347 and a pivot pin 348 therefor, with clevis 347 being connected to the outer side thereof by bolts (not visible) and by means of which the clamp bracket 306 is connected to linkage 28.

Linkages 28 and 30 are operated by the cam rollers 50 and 52 which track in the grooves 46 and 48, respectively, of barrel cam 24. Linkages 28 effects movement of the clamp/cut assemblies 302 and 304 toward and away from each other in the direction of arrow X in FIG. 6. Linkage 30 effects movement (in the direction of arrow Y in FIG. 6) of the movable clamp support members 324 and the movable tool support members 322 of the clamp/cut assemblies 302 and 304.

Figure 3:
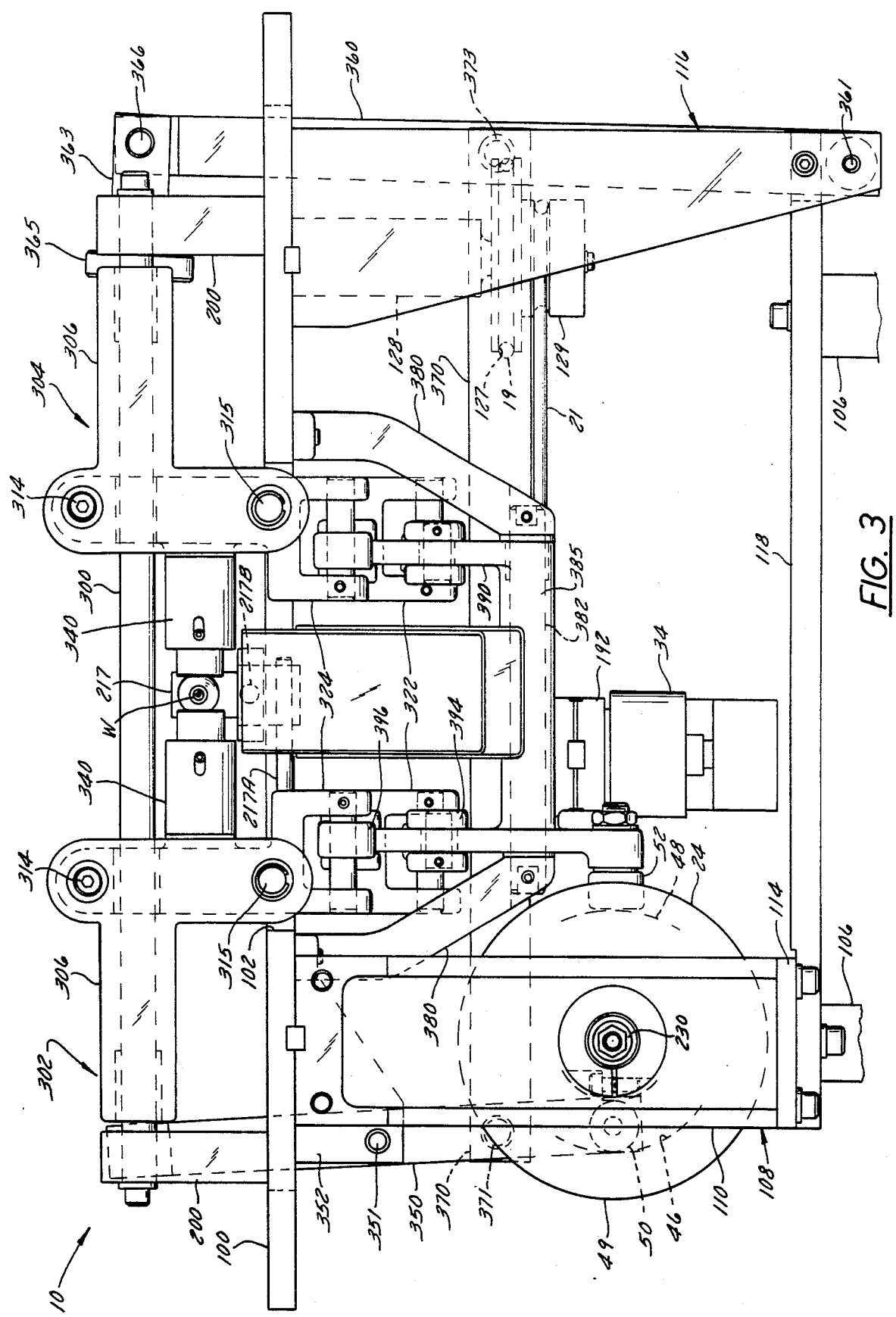
FIG. 3 is a discharge end elevation view of the apparatus of FIGS. 1 and 2 and shows the said components in retracted/open condition.

As FIGS. 3, 4 and 6 show, linkage 28 comprises vertical lever 350 which is pivotally mounted by a pin 351 between brackets 352 which are rigidly secured to the underside of plate 100 and the lever extends upwardly through an opening 353 in plate 100. Cam roller 50 is rotatably mounted on the lower end of lever 350. A pivot link 355 is pivotally connected by a pivot pin 356 to the upper end of lever 350. Pivot link 355 is also connected to pivot pin 348 of clevis 347 of clamp bracket 306.

Linkage 28 further comprises another vertical lever 360 which is pivotally mounted at its lower end by a pin 361 between previously mentioned brackets 116 (see FIG. 3) on the underside of plate 100. The previously mentioned stroke adjustment mechanism 306 is connected between the upper end of lever 360 and the clevis 347 of clamp/cut assembly 304 (see FIGS. 1, 3 and 4). Stroke adjustment mechanism 306 comprises two pivot links 363 and 364 which are connected by an adjustment screw 365. Each pivot link 363, 364 comprises a pivot pin 366 at one end and a threaded bore 367 at its other end. Screw 365 has threaded ends which threadedly engage the threaded bores 367 in the pivot links 363, 364 and manual rotation of the screw adjusts the spacing between the pivot links 363, 364 and, thus, the spacing between the lever arms 350 and 360. The pivot link 363 is pivotally connected by the pivot pin 366 to the upper end of lever 360. The levers 350 and 360 are interconnected with each other by a cross link member 370 which is pivotally connected at one end to lever 350 by a pivot pin 371 in the form of a bolt located between roller cam 50 and pin 351. The other end of cross link member 370 is pivotally connected to lever 360 by a pivot pin 373 located between pivot pins 361 and 366. Thus, with respect to FIG. 4, when lever 350 pivots counterclockwise, lever 360 pivots clockwise, and vice-versa, in response to rotation of barrel cam 24 which rotates clockwise. The stroke adjustment mechanism 306 can be adjusted by means of rotation of its adjustment screw 365 to change by a small amount the spacing between and the travel of the clamp/cut assemblies 302 and 304.

As FIGS. 3, 4, 6 and 7 further show, the movable clamp support member 324 moves a greater distance and at a faster rate of speed than the tool support members 322 when traveling from fully retracted position (FIGS. 1 and 7), through partially extended position (FIG. 8) to fully extended position (FIG. 9). Note that the tool support members 322 have reached their fully extended position in FIG. 8.

As FIGS. 2, 3, 4, 5, 6 and 11 show, linkage 30 comprises a pair of downwardly extending rigid lever support brackets 380 which are rigidly secured to the underside of plate 100 by screws 381 and which rigidly support a cylindrical hoizontally extending pivot shaft 382 therebetween. A strip actuating lever 384, which comprises a tubular section 385 for receiving shaft 382, is pivotally mounted on pivot shaft 382. Strip actuating lever 384 has a downwardly extending lower arm 386 on which cam roller 52 is rotatably mounted. Strip actuating lever 384 also comprises a pair of arms 388 and 390 which extend upwardly from tubular section 385 near opposite ends thereof.

As FIG. 6 makes clear, each arm 388 is provided at its upper end with a pivot pin 392 which is pivotally connected to one end of a trailing strip link 394. The other end of the trailing strip link 394 is pivotally connected to clevis pin 346 on the lower end of movable clamp support member 322. The arm 388 is also provided between its upper end and tubular section 385 with another pivot pin 395 which is pivotally connected to one end of a leading strip link 396. The other end of the leading strip link 396 is pivotally connected to the clevis pin 346 on the lower end of movable tool holder support member 324. This linkage arrangement effects differential movement between the two movable support members 324 and 322, as previously explained.

I claim:

1. Apparatus for feeding, cutting and stripping an insulated wire strand comprising:
   wire feed means operable to feed said strand along a path;
   wire cutter/stripper means for receiving said wire strand from said wire feed means and operable to cut a wire segment from said strand and to strip insulation;
   drive means for operating said wire feed means and said cutter/stripper means and comprising a motor, a selectively operable feed clutch mechanism connected between said motor and said wire feed means, a rotatable cam, a selectively operable one-revolution clutch mechanism connected between said motor and said cam, and linkage means connected between said cam and said wire cutter/stripper means;
   and control means for controlling operation of said feed clutch mechanism and said one-revolution clutch mechanism and comprising timer means to initiate operation of said feed clutch mechanism to start wire feed, wire measuring means responsive to the length of strand fed to operate said feed clutch mechanism to terminate wire feed and to initiate operation of said onerevolution clutch mechanism and thereby initiate operation of said wire cutter/stripper means.

2. Apparatus according to claim 1 wherein said wire cutter/stripper means comprises movable cutter/stripper head means and at least movable wire clamp means, said movable wire clamp means and said cutter/stripper head means having open and closed positions and being reciprocably movable along said path between respective retracted and extended positions;
   wherein said cam comprises two cam tracks thereon;
   wherein said linkage means comprises a first linkage including a first cam follower connected to one of said cam tracks for effecting opening and closing of said movable wire clamp means and said cutter/stripper head means;
   and wherein said linkage means further comprises a second linkage including a second cam follower connected to the other of said cam tracks for effecting extension and retraction of said movable wire clamp means and said cutter/stripper head means.

3. Apparatus according to claim 2 wherein said wire cutter/stripper means further comprises a stationary wire clamp means having open and closed positions and wherein said first linkage also effects opening and closing of said stationary wire clamp means.

4. Apparatus according to claim 2 or 3 wherein the distance between the retracted and extended positions of said movable wire clamp means is greater than the distance between the retracted and extended positions of said movable cutter/stripper head means.

5. Apparatus according to claim 4 wherein each of said feed clutch mechanism and said one-revolution clutch mechanism is electrically operated and wherein each of said timer means and said wire measuring means provides an electical control signal.

6. Apparatus according to claim 1 or 2 or 3 wherein each of said feed clutch mechanism and said one-revolution clutch mechanism is elecrically operated and wherein each of said timer means and said wire measuring means provides an electrical control signal.

7. Apparatus according to claim 1 or 2 or 3 including brake means which operates to prevent wire strand movement while said feed clutch mechanism is disengaging and thereafter.

8. Apparatus for feeding, cutting and stripping an insulated wire strand comprising:

wire feed means including a rotatable wire feed member operable to feed said strand along a path;

wire cutter/stripper means for receiving said wire strand from said wire feed means and operable to cut a wire segment from said strand and to strip insulation therefrom, said wire cutter/stripper means comprising stationary wire clamp means, movable cutter/stripper head means and movable wire clamp means, both of said wire clamp means and said cutter/stripper head means having open and closed positions, said movable clamp means and said cutter/stripper head means being reciprocably movable along said path between respective retracted and extended positions, the distance between the retracted and extended positions of said movable wire clamp means being greater than the distance between the retracted and extended positions of said movable cutter/stripper head means;

drive means for operating said wire feed means and said cutter/stripper means and comprising a motor, an electrically operable feed clutch mechanism connected between said motor and said wire feed means, a rotatable cam having two cam tracks thereon, an electrically operable one-revolution clutch mechanism connected between said motor and said cam, and linkage means connected between said cam and said wire cutter/strippper means, said linkage means comprising a first linkage including a first cam follower connected to one of said cam tracks for effecting opening and closing of both of said wire clamp means and said cutter/stripper head means, said linkage means further comprising a second linkage including a second cam follower connected to the other of said cam track for effecting extension and retraction of said movable clamp means and said cutter/stripper means;

and control means for controlling operation of said feed clutch mechanism and said one-revolution clutch mechanism and comprising electric timer means to provide an electric signal to initiate operation of said feed clutch mechanism to start wire feed, wire measuring means including an electric encoder device responsive to the length of strand fed to provide an electric signal to operate said feed clutch mechanism to terminate wire feed and to initiate operation of said one-revolution clutch mechanism and thereby initiate operation of said wire cutter/stripper means.

9. Apparatus according to claim 8 including brake means which operates to prevent wire strand movement while said feed clutch mechanism is disengaging and thereafter.

* * * * *